United States Patent [19]
Rowson et al.

[11] Patent Number: 6,067,484
[45] Date of Patent: May 23, 2000

[54] DIFFERENTIAL GPS LANDING SYSTEM

[75] Inventors: Stephen Vance Rowson, Parkville; Craig A. Stull, Kansas City, both of Mo.; Albert John Van Dierendonck, Los Altos, Calif.; Lee Etnyre, Parkville; Glenn Raymond Courtney, Kansas City, both of Mo.

[73] Assignee: Airsys ATM, Inc., Shawnee, Kans.

[21] Appl. No.: 09/046,483

[22] Filed: Mar. 23, 1998

[51] Int. Cl.$^7$ .................................................. G06F 19/00
[52] U.S. Cl. ......................... 701/16; 701/213; 701/215; 342/357.06; 342/357.12; 342/358; 455/12.1
[58] Field of Search ............................ 701/16, 213, 215, 701/225, 226; 342/352, 353, 356, 357.02, 357.06, 357.12, 358; 455/12.1, 456, 524, 517

[56] References Cited

U.S. PATENT DOCUMENTS

| | | | |
|---|---|---|---|
| 5,361,212 | 11/1994 | Class et al. | 364/428 |
| 5,436,632 | 7/1995 | Sheynblat | 342/357.03 |
| 5,504,492 | 4/1996 | Class et al. | 342/357 |
| 5,596,328 | 1/1997 | Stangeland | 342/357.03 |
| 5,600,329 | 2/1997 | Brenner | 342/357.03 |
| 5,608,393 | 3/1997 | Hartman | 340/988 |
| 5,610,616 | 3/1997 | Vallot et al. | 701/14 |

*Primary Examiner*—William A. Cuchlinski, Jr.
*Assistant Examiner*—Gertrude Arthur
*Attorney, Agent, or Firm*—Bryan Cave LLP

[57] ABSTRACT

A differential GPS landing system having at least three GPS receivers at known locations in spatial proximity to each other, wherein each GPS receiver independently receives GPS signals from the plurality of GPS satellites and at least three reference stations, wherein each reference station receives a signal from a different two of the at least three GPS receivers and calculates two separate differential corrections for each satellite, wherein each differential correction is independently calculated using the signals received from a different one of the two GPS receivers. The reference stations preferably average the two calculated differential corrections for each satellite to produce an averaged differential correction for each satellite. The system then validates the averaged differential correction for each satellite calculated by each reference station using two integrity monitors, wherein each integrity monitor receives the averaged differential corrections from a different two of the at least three reference stations, and each integrity monitor compares, with respect to each GPS satellite, the averaged differential corrections from the two of the at least three reference stations to produce a validated set of differential corrections, and broadcasts the averaged differential correction for each satellite calculated by one of the three reference stations. The preferred differential GPS landing system further includes a method that utilizes current differential correction error statistics, prior differential correction error statistics and a Bayesian interval estimation bounding process to provide an error bound on the broadcast differential corrections.

15 Claims, 4 Drawing Sheets

DIFFERENTIAL GPS LANDING SYSTEM

FIELD OF THE INVENTION

The present invention relates generally to aircraft navigational systems using Global Positioning System (GPS) satellites and, more particularly, to differential GPS landing systems that assist aircraft in using data broadcast by the GPS satellites.

BACKGROUND OF THE INVENTION

As is known, the NAVSTAR Global Positioning System is a continuous, space-based navigation system that provides any suitably equipped user with highly accurate three-dimensional position, velocity and time information anywhere on or near the earth. GPS is essentially a satellite ranging system, wherein any user, such as an aircraft, can estimate its position by measuring its range to at least four GPS satellites and, using triangulation techniques, estimate its position and local clock error. The GPS system operates by timing how long it takes a radio frequency signal emitted by the satellites to reach the user and then calculating the distance based on that time measurement. While the GPS system can generally be used to provide highly accurate position information, the ultimate accuracy is degraded by the sum of several sources of error, including delays in the transmission of the signal as it travels through the ionosphere and troposphere, ephemeris errors (i.e., variations in the altitude, position and velocity of the GPS satellites), and variations between the receiver clocks and the satellite clocks. As is known, the accuracy of a GPS positioning system can be enhanced by using a technique called differential GPS, which can assist in determining the inaccuracies in the signal transmitted by the GPS satellites and provide other GPS receivers in the local area with a set of differential corrections that the other GPS receivers can use to correct their position solutions. The basic differential GPS concept is generally valid because the range from the GPS satellites to the receivers is sufficiently large that any errors measured by one receiver will be almost exactly the same for any other receiver in the same locale. Generally, a single differential correction factor will account for most errors in the GPS system, including receiver and/or satellite clock errors, variations in the positions of the satellite(s), and ionospheric and atmospheric delays.

A differential GPS landing system typically includes one or more GPS receivers located adjacent to one another at fixed, known positions, which are capable of receiving signals broadcast from a number of GPS satellites. The signals broadcast from each GPS satellite include emphemeris and course almanac data, which may be used to determine the location of the satellite. The signals also include a pseudorandom code, which can be used to determine the transmission time that the particular GPS satellite broadcast its data. This transmission time may then be used to calculate a pseudorange (i.e., a range that has not been corrected for errors in synchronization between the satellite's clock and the receiver's clock) between the GPS satellite and the GPS receiver. The GPS receiver calculates a pseudorange to each satellite in view by monitoring a pseudorandom code transmitted by the satellite and comparing this code to its own reference code to determine the transmission duration of the signal broadcast from each GPS satellite in view and received by the GPS receiver. A calculated true range between the receiver and each satellite may be determined by using the emphermis and/or course almanac data, together with stored information on the orbits and velocity of the satellites, and the known location of the receiver. The difference between the highly accurate calculated range and the computed pseudorange represents a differential range error for that given satellite's broadcast data. This difference may be broadcast to each GPS receiver in the locale to process and apply to its computed pseudoranges in order to improve the accuracy of the pseudorange computed by that GPS receiver.

Applying these concepts to a GPS system that assist aircraft in navigating and landing, a set of differential corrections may be determined by a differential GPS landing system and broadcast for reception by all aircraft within broadcast range (e.g., around a particular airport). The aircraft, using their own GPS receiver, may then receive the information broadcast from the GPS satellites, calculate a set of pseudorange range values from the information received from the GPS satellites, and receive, process and apply the differential corrections broadcast from the GPS landing system. It thereby improves the accuracy and integrity of the aircraft position determination. If the broadcast differential corrections are sufficiently accurate and reliable, a differential GPS landing system may be used in connection with a Special Category I (SCAT-I) approach and landing operation.

One of the more difficult problems in a local area differential GPS landing system is integrity monitoring of the broadcast corrections. It will be appreciated that the differential corrections that are broadcast by the differential GPS landing system must be extremely accurate and reliable and that the landing system include means for preventing the transmission of erroneous, unsafe correction data. Thus, based on RTCA DO-217 requirements for SCAT-I approach and landing systems (as expressed in the Minimum Aviation System Performance Standards DGNSS Instrument Approach System: Special Category I (SCAT-I), RTCA/DO-217, prepared by SC-159, RTCA Incorporated, Aug. 27, 1993 (including Changes 1 and 2)), a $1 \times 10^{-7}$ error bound must be placed on the differential corrections with an integrity of this bound equal to $1 \times 10^{-8}$.

One approach for enhancing the integrity of the calculated differential corrections is to provide redundant processors that also receive satellite data from a number of GPS receivers. Each processor calculates its own set of differential corrections using data received from the plurality of GPS receivers, that are then averaged together in some fashion to form the overall system differential corrections. For example, each processor may initially form independent sets of differential corrections for the data received by each receiver, combine these corrections into an overall processor set of corrections, which may then be combined with the corrections calculated by other processors. A drawback to this approach is that each processor is essentially performing the identical calculations on substantially identical data and, thus, cannot account for errors which may occur because of common mode failures. Prior approaches typically assume that each processor will receive and process all data received by the receivers included in the differential GPS landing system. This approach may be further enhanced by providing an integrity monitoring function that ensures that the overall system differential corrections fall with a predefined threshold. However the predefined threshold must be derived from knowledge of the statistics of the error at a particular time with a particular hardware configuration. The statistics of the error can change over time, thus invalidating the original predefined threshold.

Thus, there is a continuing need for a differential GPS landing system that produces differential corrections that improve ranging accuracy in order to support precision approaches, while also providing timely integrity information of the data broadcast to aircraft for validation and processing.

SUMMARY OF THE INVENTION

The above-identified needs are met by the present invention, which includes a differential GPS landing system for broadcasting a set of differential corrections relating to a plurality of GPS satellites, wherein each GPS satellite broadcasts GPS signals containing information that may be used by receivers of the GPS signals to calculate a pseudorange from the receiver to the satellite. Preferably, the present invention includes at least three GPS receivers at known locations in spatial proximity to each other, wherein each GPS receiver independently receives the GPS signals from the plurality of GPS satellites and produces a receiver output signal comprising a set of pseudoranges for the GPS satellites to the particular receiver. Preferably, the differential GPS landing system of the present invention further includes at least three reference stations, wherein each reference station receives the receiver output signal from a different two of the at least three GPS receivers and calculates two separate differential corrections for each satellite, wherein each differential correction is independently calculated using the output signals received from a different one of the two GPS receivers. The reference stations preferably average the two calculated differential corrections for each satellite to produce an averaged differential correction for each satellite. The presently preferred GPS landing system then validates the averaged differential correction for each satellite calculated by each reference station and broadcasts the averaged differential correction for each satellite calculated by one of the three reference stations.

Preferably, in one embodiment, the differential GPS landing system validates the averaged differential correction using two integrity monitors, wherein each integrity monitor receives the averaged differential corrections from a different two of the at least three reference stations, and each integrity monitor compares, with respect to each GPS satellite, the averaged differential corrections from the two of the at least three reference stations to produce a validated set of differential corrections comprising a validated differential correction for each satellite, which then may be broadcast by the system. The presently preferred differential GPS landing system may further include means for comparing the validated differential corrections from each of the two integrity monitors to produce a broadcast set of differential corrections comprising one differential correction value for each GPS satellite.

The DGLS preferably post-checks its broadcast messages by directly comparing the transmitted message that is received through the integrity data link receiver. In this embodiment, the differential GPS landing system further includes means for receiving the broadcast set of differential corrections and means for comparing the received broadcast set of differential corrections to the broadcast set of differential corrections to validate the broadcast set of differential corrections.

The differential GPS landing system may further include a position monitor responsive to the signals broadcast by the GPS satellites and the received broadcast set of differential corrections for computing the position of the receiver and for comparing the computed position with the receiver's known location to a predetermined position threshold and for halting the broadcast of differential corrections when the comparison exceeds the predetermined position threshold.

The differential GPS landing system preferably includes a method that utilizes current differential correction error statistics, prior differential correction error statistics and a Bayesian interval estimation bounding process to provide an error bound on the broadcast differential corrections. This error bound is computed such that the desired integrity is achieved for the broadcast differential corrections with sufficient continuity of function.

BRIEF DESCRIPTION OF THE DRAWINGS

These and other features, aspects, and advantages of the present invention will become better understood with regard to the following description, appended claims, and accompanying drawings wherein:

These drawings are provided for illustrative purposes only and should not be used to unduly limit the scope of the present invention.

DETAILED DESCRIPTION OF THE INVENTION

Figure 1:
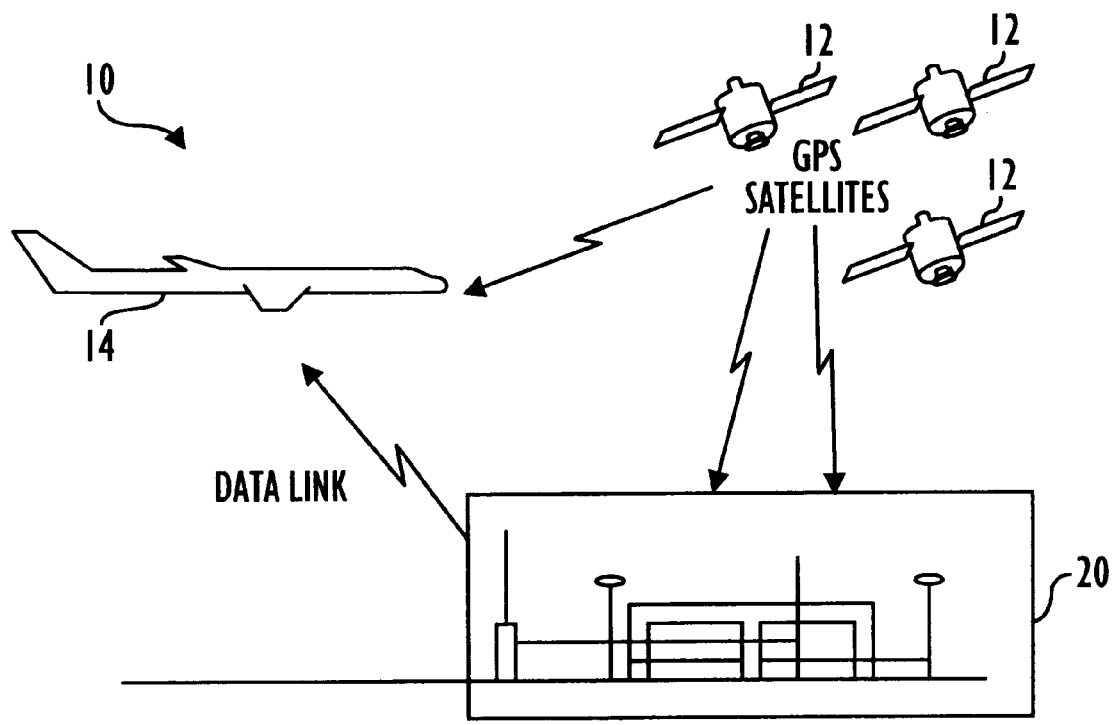
FIG. 1 is a block diagram showing the presently preferred differential GPS landing system in use with a number of GPS satellites and an aircraft.

Referring now to FIG. 1, therein is illustrated a preferred overall navigational system 10 that includes a Differential GPS Landing System (DGLS) 20. The navigational data from a plurality of GPS satellites 12 is received by both aircraft 14 and the DGLS 20. The DGLS 20 computes a set of augmentation data, including differential corrections and associated user differential range error (UDRE) data, and broadcasts the data via a data link for reception and processing by the aircraft 14.

Figure 2:
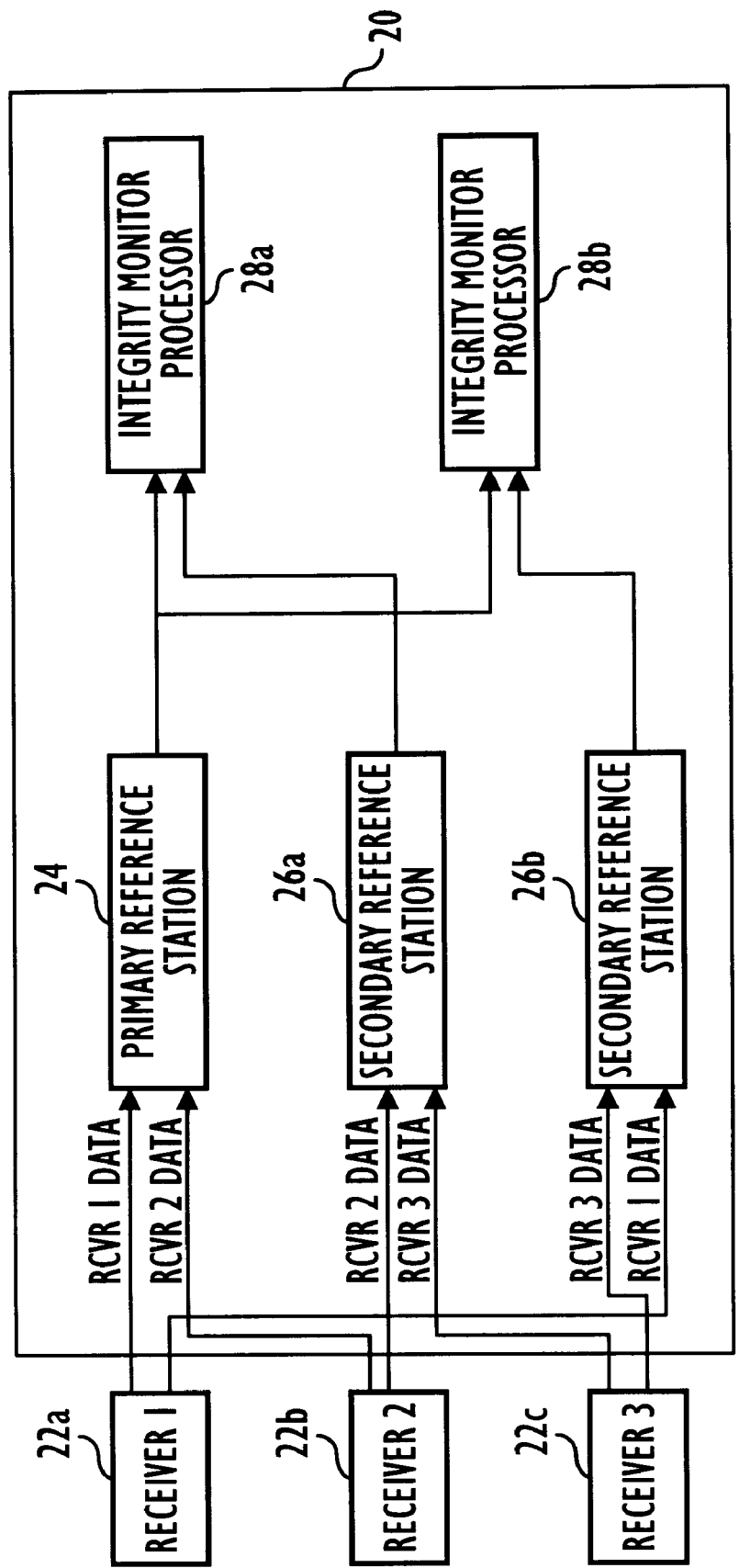
FIG. 2 is a block diagram showing the major components of the presently preferred GPS landing system.

As shown in FIG. 2, the preferred DGLS 20 includes at least three GPS receivers 22a, 22b, and 22c (collectively referred to as numeral 22) designed to acquire and track all unobstructed GPS satellites in view of the DGLS 20. Each receiver 22 has a conventional GPS antenna, which preferably locks on to the GPS signals transmitted by each GPS satellite 12 in view of the antennas 22, and provides measurements (pseudorange, carrier phase, signal-to-noise ratio) and data (ephemeris, satellite clock corrections, GPS time) for each satellite 12. Preferably, each receiver 22 includes its own independent antenna to provide multipath decorrelation and data source independence. The three GPS receivers 22 are connected to two of three independent reference stations, designated as primary reference station 24 and secondary reference stations 26a and 26b. For example, as shown in FIG. 2, primary reference station 24 receives satellite data received by receiver 22a and 22b, secondary reference station 26a receives satellite data received by receiver 22b and 22c, while secondary reference station 26b receives satellite data received by receiver 22a and 22c. Thus, the outputs from the receivers 22 are transmitted to the three reference stations 24, 26a and 26b in such a way that no two reference stations receive or use the same set of receiver data. Thus, each reference station 24, 26a and 26b processes data from a different pair of receivers 22 in order to maintain independence between the reference stations and monitoring functions, as discussed below. Of course, it will be understood by those skilled in the art that the pairing of receivers 22 and reference stations 24, 26a and 26b may be arranged in other ways, provided that each reference station receives data from two different receivers 22 and each receiver 22 is connected to two different reference stations 24, 26a or 26b. Additionally, the DGLS 20 may include backup redundant reference stations and receivers so that, in the event of a failure of one reference station or receiver, the system will still operate at full capacity.

The measurements and data provided by the receivers 22 are processed and used by the reference stations 24, 26a and 26b, which each produce differential corrections for all satellites 12 that are, after passing certain integrity checks, broadcast as navigational messages for reception and processing by aircraft 14.

Each reference station 24, 26a and 26b performs similar functions. The data received by a reference station 24, 26a and 26b, from a first receiver, for example receiver 22a (identified as primary data), is dedicated to generate a set of differential corrections (one for each satellite 12 in view in each epoch). The GPS measurements and data received from a second receiver, for example 22b (secondary data), is used to generate similar pseudorange correction data. Thus, each reference station 24, 26a and 26b, independently receives independent data from two of the three GSP receivers 22 (including ranging and ephemeris information) and computes differential corrections for the data received from each of the two receivers 22 for all satellites in view. Each reference station, 24, 26a and 26b, then computes, for each satellite in each epoch, an average of each of the two differential corrections independently computed using data from each of the two separate receivers 22 connected to that particular reference station 24, 26a or 26b. Additionally, each reference station, 24, 26a and 26b, independently calculates a user differential range error (UDRE) value for the averaged differential correction formed using data from each of the two receivers 22 connected to that particular reference station.

The preferred DGLS 20 further includes two integrity monitor processors 28a and 28b. Integrity monitor processor 28a is preferably configured to receive data (including the differential corrections and UDRE data) from the primary reference station 24 and one of the secondary reference stations (either 26a or 26b). The second integrity monitor processor 28b is preferably configured to receive data from the primary reference station 24 and the other secondary reference station 26a or 26b, that is not connected to the first integrity monitor processor 28a. In this way, both an independently computed set of differential corrections, as well as an independently computed set of UDRE data values, can be independently compared in the integrity monitor processors 28a and 28b. The integrity monitor processors 28a and 28b each cross-check the computations of the primary and secondary reference stations 24, 26a and 26b (as described below) and, if acceptable, those acceptable differential corrections and UDRE values computed by the primary reference station 24 are ultimately broadcast for reception and processing by aircraft 14.

Figure 3:
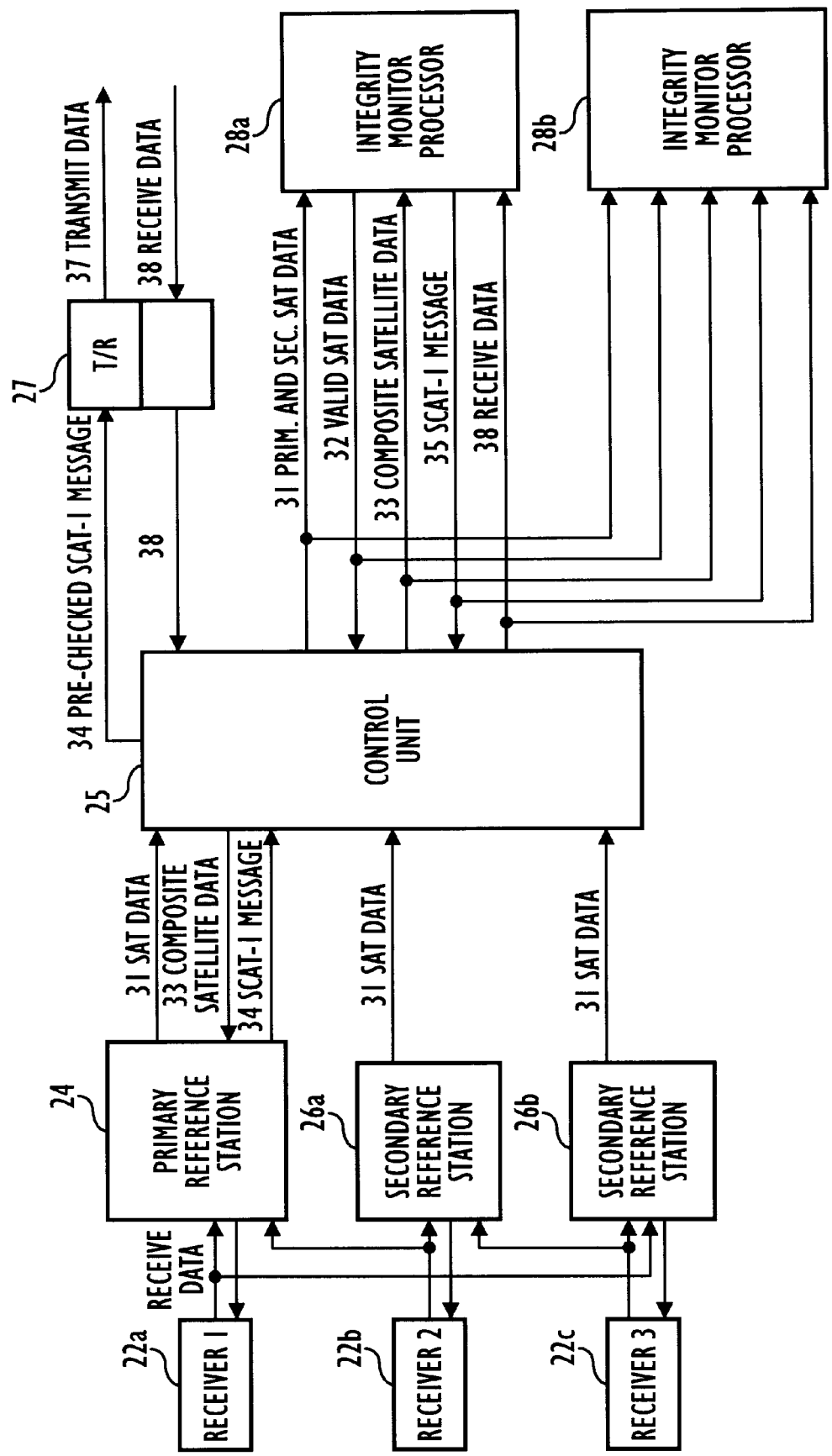
FIG. 3 is a further detailed block diagram of the major components of the presently preferred GPS landing system.

Referring now to FIG. 3, therein is illustrated a presently preferred architecture and processing flow for the DGLS 20, including receivers 22, primary reference station 24, secondary reference stations 26a and 26b, integrity monitors 28a and 28b, control unit 25 and a DGLS transmitter/receiver 27. The control unit 25 preferably routes the data appropriately between the reference stations 24, 26a and 26b, the integrity monitors 28a and 28b and the DGLS transmitter/receiver 27 and, preferably, performs certain functions as described herein. Although, the control unit 25 is shown in FIG. 3 as a separate computing device, it should be understood by those skilled in the art that the function performed by the control unit 25 may be combined as part of a single processing device in combination with another function, such as, for example, one or more of the reference stations 24, 26a or 26b.

As described above, each receiver 22 receives an RF signal from each GPS satellite in view from a dedicated GPS antenna and forwards its GPS measurements and data to two of the three reference stations, 24, 26a and 26b. Each reference station 24, 26a and 26b computes a set of differential corrections, common clock offsets, and UDREs (one set for each satellite in view) and forward this satellite data 31 to the control unit 25, which then preferably routes the satellite data 31 received from each reference station 24, 26a and 26b to the appropriate integrity monitor 28a or 28b.

Both integrity monitors 28a and 28b perform identical functions, although on different sets of satellite data. Each integrity monitor 28b and 28b receives the averaged pseudorange corrections from the primary reference station 24 and one of the secondary reference receivers 26a or 26b, and, for each satellite, computes the difference between the two independently generated corrections and compares the results, for example, to a preset limit, and excludes satellites which fall outside the preset limit. The results of this pre-check are performed for all satellite data 31 in each integrity monitor 28a and 28b and are then transmitted as valid satellite data 32 to the control unit 25.

The integrity monitors 28a and 28b also receive the estimated parameters from the UDRE data determination processes (as described below) from the primary reference station 24 and one of the secondary reference receivers, 26a or 26b, and compares these values to ensure that they are within a preset limit. If any of these two comparisons indicate an out-of-bounds condition, then that set of differential corrections and UDRE data for that particular satellite are declared invalid by the integrity monitor, 28a or 28b.

The pre-check data (i.e., the list of valid satellite data 32) is transmitted by each integrity monitor 28a and 28b to the control unit 25, which may preferably perform an AND operation (i.e., both integrity monitors 28a and 28b must agree that the correction data for a particular satellite is valid). Alternatively, for use in a high continuity mode (rather than a high integrity mode), the control unit 25 may perform an OR operation, wherein either integrity monitor 28a or 28b may declare a satellite valid. After combining the valid satellite data 32 from the two integrity monitors 28 and 30 to form a composite valid satellite data set 33, the control unit 25 transmits the composite satellite data set 33 to all integrity monitors 28a and 28b, and all reference stations 24, 26a and 26b. Preferably, each integrity monitor 28a and 28b retains the original satellite data 31 received from the primary reference station 24, formats a differential correction message 35 based on this satellite data 31 and the composite valid satellite data set 33 received from the control unit 25 for later validation of the broadcast message.

Each reference station 24, 26a and 26b receives the composite satellite data set 33 from the control unit 25 and generates a formatted differential correction message 34, which is then transmitted to the control unit 25. The control unit 25 preferably performs a three-way pre-transmit bit-by-bit compare between the type 1 messages 34 and 35 generated by the primary reference station 24 and the integrity monitors 28a and 28b. If the bit-by-bit comparison fails, the control unit 25 will prevent broadcast of the message. If the comparison is successful, the control unit 25 forwards the type 1 message 34 generated by the primary reference station 24 to the DGLS transmitter/receiver 27 for broadcast.

Preferably, the integrity monitors 28a and 28b perform a post-broadcast check on the transmitted data 37. The DGLS transmitter/receiver 27 receives the message 38 that was broadcast, and routes that message 38 to the integrity monitors 28a and 28b through the control unit 25. The integrity monitors 28a and 28b compare the type 1 message 38 received by the DGLS transmitter/receiver 27 to the type 1 message 35 originally transmitted to the control unit 25 during the message pre-check function. If the comparison fails, an alarm is generated and the message generation is stopped.

Preferably, the present invention also provides for a position monitoring function to detect unsafe broadcasts that may occur because of common mode errors in the reference stations 24, 26a and 26b. Thus, the DGLS transmitter/receiver 27 receives the differential corrections and UDRE data 37 broadcast by the DGLS 20. The positioning monitoring function, which may preferably be located within the integrity monitors 28a and 28b, computes its calculated position using the data 37 broadcast by the DGLS 20 and the GPS satellites (as received by receivers 22) and then compares its calculated position with its known, surveyed true position. If the calculated position varies from the true position by a predetermined limit, the DGLS 20 will preferably cease broadcasting information. Thus, the position monitor function provides protection integrity against the effects of undetected common mode failures and provides a significant measure of independence to the overall system.

Figure 4:
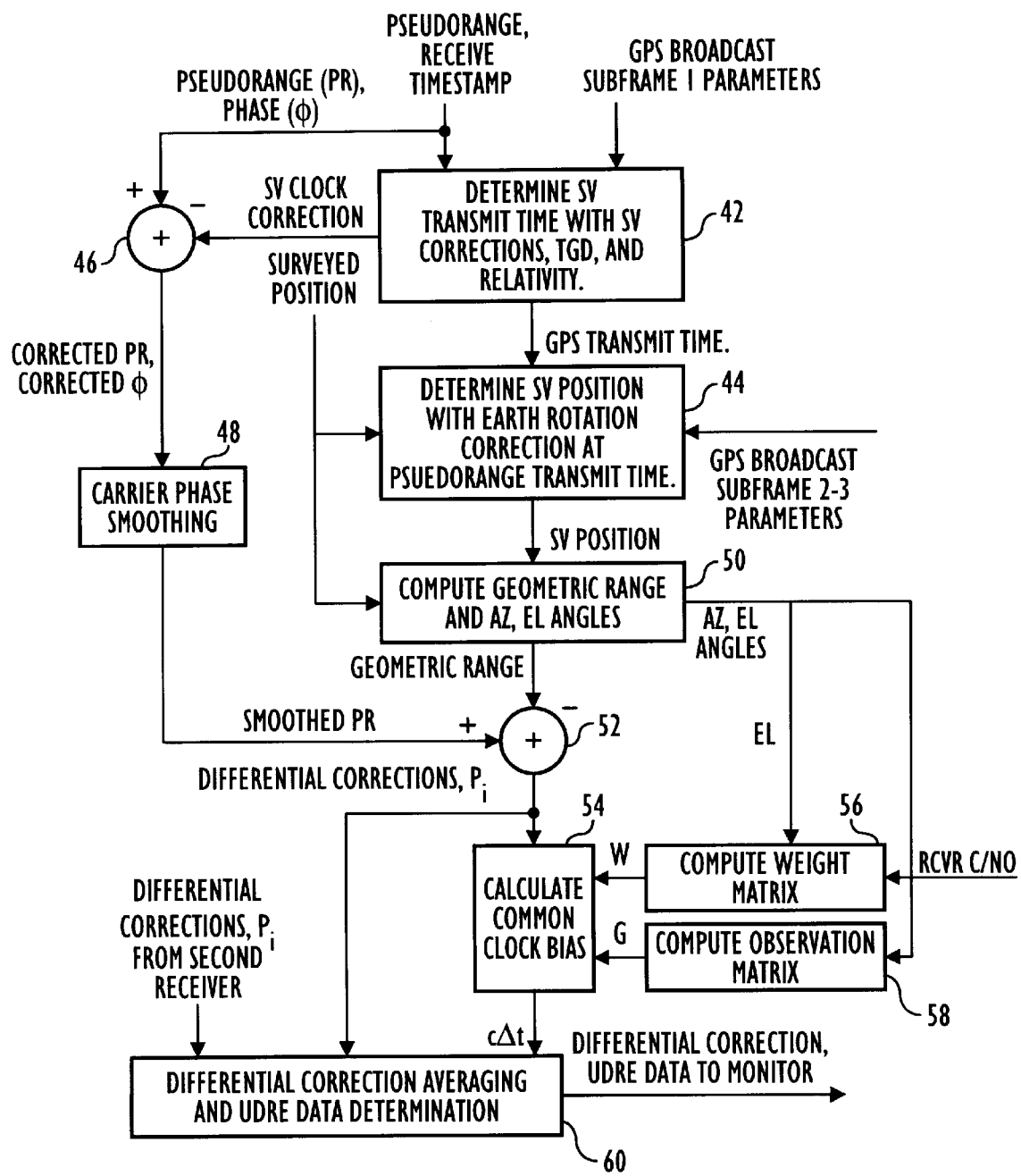
FIG. 4 is a process flow diagram showing the processing of the reference stations of the present invention.

Referring now to FIG. 4, therein is illustrated a block diagram showing the preferred processing performed in the primary and secondary reference stations 24, 26a and 26b to calculate the differential corrections, common clock offset and associated UDRE data for each satellite in view of the receivers 22 connected to a particular reference station. This processing is preferably performed in each reference station on a satellite by satellite basis in each measurement epoch, which may range from 0.5 seconds (using a 2 Hz receiver 22) to once every ¼ to ⅙ second for an advanced CAT II/III system. The processing is preferably performed on pseudorange measurements made by a receiver 22 in an epoch for all receivers connected to each reference station 24, 26a, and 26b. Thus, each receiver 22 determines a pseudorange measurement from the receiver to each satellite and provides these pseudorange measurements to each reference connected thereto.

In block 42, the time that the satellite 22 transmits its pseudorange information, SV clock corrections, Tgd and relativity term is computed in a manner well known in the art. The computed transit time is used in block 44 to determine the position of the satellite 12, accounting for the earth's rotation at the pseudorange transmit time. In block 46, the pseudorange and carrier phase are corrected using the satellite clock, relativity term and $T_{gd}$ correction computed in block 42. In block 48, the code is preferably smoothed with the carrier. In block 50, the geometric range, azimuth and elevation angles from the receiver 22 to the particular satellite are computed in a manner well known in the art.

Preferably, each reference station 24, 26a and 26b computes differential corrections and the common clock using the computed geometric range determined from the broadcast satellite ephemeris and the corrected and smoothed pseudorange measurement (as shown in block 52). The differential correction for a particular satellite is calculated as the difference between the measured pseudorange and the predicted geometric range as:

$$\Delta\rho_i = P^{ENU}_i - PR_{S,i}$$

where:

$PR_{S,i}$ represents the carrier-smoothed pseudorange i between reference station j and satellite i (measured); and $P^{ENU}_i$ represents the computed geometric range i between reference station j and satellite i from broadcast ephemeris.

In order to determine the common clock, an observation matrix is computed in block 58 as:

$$\Delta\rho = G\Delta\vec{x}$$

where:

$\Delta\rho$ represents a vector (N×1) of differential corrections;

G represents an observation matrix (N×4);

$\Delta\vec{x}$ represents a vector of corrections to the solution vector (north, east, up, and time) $\vec{x}$ $(x_E, x_N, h, c\Delta t)^T$ (in tangent plane coordinates ENU and the clock term); and N represents the number of satellites with valid pseudoranges received in the measurement epoch.

The rows of $\tilde{G}$ for satellite i are given by $$g_i = [\cos(az_i)\cos(el_i), \sin(az_i)\cos(el_i), \sin(el_i), 1]$$

where:

$az_j$ represents the azimuth of satellite i with respect to true north; and $el_i$ represents the elevation of satellite i to the reference station j.

A weight matrix is computed in block 56 as:

$$\tilde{W} = \begin{pmatrix} 1/\sigma_1^2 & 0 & \cdots & 0 \\ 0 & 1/\sigma_2^2 & \cdots & 0 \\ 0 & 0 & \ddots & \vdots \\ 0 & 0 & \cdots & 1/\sigma_2^2 \end{pmatrix}$$

where weighting elements are estimated measurement variances for the associated differential correction, and where $1/\sigma^2_N = f(el_i)$ where:

$el_i$ represents the elevation angle of satellite i; and $f(el_i)$ represents 3 $\sin(el_i)$ for el=5 to 90 degress and 0.2 for el<5 degrees.

In block 54, the common bias of the clock within receiver 22 is calculated as the batch least squares solution as:

$$\Delta\vec{x} = K\Delta\rho = (G^T W G)^{-1} G^T W \Delta\rho.$$

After solving for $\Delta\vec{x}$, the clock term $c\Delta t$ is used in the computation of the pseudorange residuals. This allows the reference and monitor station data to be combined without local receiver clock biases.

In block 60, the process computes an average of the differential corrections computed using data from two independent receivers 22 and computes the UDRE data. The differential correction for this particular reference station is computed by averaging the two differential corrections computed using the data from the two receivers 22 connected to this reference station, for example, as follows:

$$\Delta \rho'_{ij} = \frac{(\Delta \rho'_{ia} - c\Delta t_a) + (\Delta \rho'_{ib} - c\Delta t_b)}{2}$$

where:

$\Delta \rho'_{ij}$ represents the averaged differential correction for satellite i;

$\Delta \rho'_{ia}$ represents the differential correction for satellite i computed with data from a first receiver, identified as a data;

$\Delta \rho'_{ib}$ represents the differential correction for satellite i computed with data from a second reference, identified as b data; and $c\Delta t_a$, $c\Delta t_b$ represents the receiver clock estimates.

As discussed earlier, the requirements for a SCAT-1 approach and landing system demand a $1 \times 10^{-8}$ error bound be placed on the differential corrections with an integrity of this bound equal to $1 \times 10^{-7}$. Although many factors determine the size of the error bound, such as multi-path mitigation and receiver noise performance, two major impacts on the estimation process are the ability to obtain independent samples and the number of samples available during the time period for computing the error bound (the "time-to-alarm" limit). For example, using a 2 Hz receiver with a time-to-alarm limit of 3 seconds provides a maximum of only six samples of data. A traditional statistical or interval bounding approach can result in overly conservative error bounds for such small sample sizes.

The presently preferred solution to these problems is to use error knowledge available in the form of recently observed error behavior in addition to the current error samples. The UDRE data for the satellite is computed by first forming a residual from the averaged differential correction computed by the primary reference station 24 and the averaged differential correction computed by one of the secondary reference stations 26a or 26b. This residual is formed by subtracting each reference station's clock estimate from the associated differential correction and then subtracting this difference to form the UDRE data residual as follows:

$$\epsilon_i = (\Delta \rho'_{ij}) - (\Delta \rho'_{ib} - c\Delta t_b)$$

where:

$e_i$ represents the differential correction residual for satellite i;

$\Delta \rho'_{ij}$ represents the averaged differential correction for satellite i;

$\Delta \rho'_{ib}$ represents the differential correction for satellite i computed with receiver b data (obtained from one of the secondary reference stations 26a or 26b; and $c\Delta t_b$ represents the receiver common clock estimate.

The UDRE data residual is used to form an error bound on the broadcast differential corrections, using Bayesian interval estimation bounding techniques. Bayes' Theorem states as follows: suppose that $x = (x_1, \ldots, x_n)$ is a vector of n observations whose probability distribution $p(x|\Theta)$ depends upon the values of k parameters $\Theta = (\theta_1, \ldots, \theta_k)$. Suppose also that $\Theta$ itself has a probability distribution $p(\Theta)$. Then, the joint probability of x and $\Theta$ can be equated as:

$$p(x|\Theta)p(\Theta) = p(x,\Theta) = p(\Theta|x)p(x) \quad (1)$$

Given the observed data x, the conditional distribution of $\Theta$ is $$p(\Theta|x) = \frac{p(x|\Theta)p(\Theta)}{p(x)} \quad (2)$$

Also, $$p(x) = E[p(x|\Theta)] = c^{-1} = \int p(x|\Theta)p(\Theta)d\Theta \quad (3)$$

where $E[f(\Theta)]$ is the mathematical expectation of $f(\Theta)$ with respect to $p(\Theta)$. Thus, Equation 1 becomes $$p(\Theta|x) = cp(x|\Theta)p(\Theta) \quad (4)$$

Equation 2, or equivalently, Equation 4, is usually referred to as Bayes Theorem. For further reference on Bayes Theorem, see Box, G.E.P. and Tiao, G. C., Bayesian Inference in Statistical Analysis, Wiley Classics Library Edition, John Wiley and Sons, Inc., New York, 1992. In this expression, $p(\Theta)$, which defines what is known about $\Theta$ without the knowledge of the data, is called the prior distribution of $\Theta$. Correspondingly, $p(\Theta|x)$, which defines what is known about $\Theta$ given the knowledge of the data, is call the posterior distribution of $\Theta$ given x. The quantity c is merely a "normalizing" constant to ensure that the posterior distribution $p(\Theta|x)$ integrates to 1.

If $p(\Theta|x)$ can be determined for some prior distribution of $\Theta$, then certainly a bound B can be found such that $$\int_B p(\Theta|x)d\Theta = 0.9999999 \quad (5)$$

The key here is that knowledge of the prior error mean $\mu_0$ exists (normally zero for estimation processes over a long time period) and a standard deviation of the error, $\sigma_0$, each with some uncertainty, from error estimation processes and measurement error estimates. Because of the nature of these processes (long smoothing time-constants and the properties of measurement noise), one can reasonably assume that the errors are normally distributed or over-bounded with a normal distribution, at least in the long term. Probability densities such as given in the above equations have been derived for reasonably defined prior densities for $\mu$ and $\sigma^2$, given $\mu_0$ and $\sigma_0$ and are provided in a number of references, such as Gelman, A., Carlin, J. B., Stern, H. S., and Rubin, D. B., Bayesian Data Analysis, Chapman & Hall, London, 1995. However, the equation is likely to take on a different form, such as $$B = B(\bar{\mu}, S, \sigma^2_0, \mu_0, n, 0.9999999) \quad (6)$$

plus any other parameter used to define uncertainties in the prior densities. For example, inferred from the above reference, using a prior normal distribution of the mean with a mean of $\mu_0$ and a variance of $\sigma_0^2/\kappa_0$ and a prior scaled-inverse-chi-square distribution of the variance with $v_0$ degrees of freedom and a scale of $\sigma_0$, the bound may be defined as:

$$B = |\mu_n| + T^* \sigma_n \quad (7)$$

$$= \left| \frac{\kappa_0}{n + \kappa_0} \mu_0 + \frac{n}{n + \kappa_0} \bar{\mu} \right| +$$

-continued $$K^* \sqrt{\frac{v_0\sigma_0^2}{v_0+n} + \frac{(n-1)S^2}{v_0+n} + \frac{\kappa_0 n(\bar{\mu}-\mu_0)^2}{(n+\kappa_0)(v_0+n)}}$$

$$= \left|\frac{\kappa_0}{\kappa_n}\mu_0 + \frac{n}{\kappa_n}\bar{\mu}\right| +$$

$$K^* \sqrt{\frac{v_0\sigma_0^2}{v_n} + \frac{(n-1)S^2}{v_n} + \frac{\kappa_0 n(\bar{\mu}-\mu_0)^2}{\kappa_n v_n}}$$

which is an estimate of the function $B=|\mu|+K\sigma$, assuming a normal distribution, where now $$K^* \approx \sqrt{\left(t_{0,Y h,\kappa_n}/\sqrt{\kappa_n}\right)^2 + \left(Norm(Y)\sqrt{v_n/\chi^2_{0,Y(10-h),v_n}}\right)^2} \quad (8)$$

where:

$\kappa_n = \kappa_0 + n$ $v_n = v_0 + n$ n represents the umber of samples;

$\kappa_0$, $v_0$ are parameters that define the "spread" or uncertainty in the prior distributions (as discussed below); and Norm(Y) represents the normal distribution confidence interval for the required correction integrity level (in the case of a $1 \times 10^{-7}$ integrity level, Y=0.9999999 and Norm(Y)=5.33).

The parameters $v_0$ and $\kappa_0$ define the "spread" or uncertainty in the prior variance and mean, respectively, —the larger they are, the less spread exists. Note that the quantity under the radical is a weighting of the prior variance and the posterior sample variance, plus a sample mean-squared term representing the uncertainty in the prior mean. For larger values of $v_0$ and $\kappa_0$, which is reasonable for the DGLS application, this method allows for small sample sets that are necessary for a short time-to-alarm. The new estimate of the variance $\sigma^2_n$ is the quantity under the radical with degrees of freedom $v_0+n$. The new estimate of the mean is on, whose absolute value is the first term of Equation 6, with variance $\sigma^2_n/(\kappa_0+n)$.

The parameter $\kappa_0$ defines the uncertainty (variance) of the prior mean to be a percentage of that of the prior error distribution itself. The parameter $v_0$ defines the uncertainty (variance) of the prior variance, where $$E(\theta) = \frac{v_0}{v_0-2}\sigma_0^2, \text{ for } v_0 > 2 \quad (9)$$

and $$\text{var}(\theta) = \frac{2v_0^2}{(v_0-2)^2(v_0-4)}\sigma_0^4, \text{ for } v_0 > 4 \quad (10)$$

This forms the basis of setting the bound in the broadcast differential corrections. The a priori parameters and $v_0$ are preferably determined during installation of the DGLS as part of the installation and updated periodically much like a flight inspection.

The presently preferred solution incorporates the UDRE data residual into the Bayesian error bound is to determine a current (short-term) mean, current variance, prior (long-term) mean and prior variance. The current mean ($\bar{\mu}$) is preferably computed by determining the mean of the last n samples where n<=6. The preferred method of computing the current variance ($s^2$) is to determine the variance of the current mean. The preferred method of computing the prior mean is to use a exponentially decaying average of the current mean. This is shown as:

$$\bar{\mu}_{i,k} = \frac{\kappa_0}{\kappa_0+1}\bar{\mu}_{i,k-1} + \frac{1}{\kappa_0+1}\bar{\mu}_{i,k-1} \quad (11)$$

is the a priori mean, where $$\bar{\mu}_{i,k} = (\Delta\rho'_{i,k}) - (\Delta\rho'_{ib,k} - clk_{b,k}) \quad (12)$$

is the measured difference in the average of the two receivers. This value is averaged over the appropriate time interval $\Delta t$. The time constant is set as:

$$TC = (\kappa_0+1)\Delta t \quad (13)$$

which is used to define $\kappa_0$. Preferably, the method of determining the prior variance given as:

$$\sigma^2_{i,k} = \frac{1}{2^2}\left(\frac{(\sigma^2_{i,k,model} + \sigma^2_{A,i,k,S/N_0}) +}{(\sigma^2_{i,k,model} + \sigma^2_{B,i,k,S/N_0})}\right) \quad (14)$$

which, in general, models uncertainties in time-correlated measurements.

To determine the prior variance, a model is used that characterizes the performance of the receiver as a function of signal to noise ratio. A receiver would have a variance in chips$^2$ (ignoring squaring loss) based on the formula given in the reference, Van Dierendonck, A J, Fenton, P., and Ford, T., "Theory and Performance of Narrow Correlator Spacing in a GPS Receiver," *Proceedings of the ION National Technical Meeting*, Jan. 27, 1992, San Diego, Calif.:

$$\sigma^2_{x,i,k,S/N_0} = \frac{B_l d}{2S/N_0} \quad (15)$$

where:

x represents one of the receivers;

$B_L$ represents the receiver code tracking loop noise bandwidth in Hz;

d represents the correlator spacing (in chips (typically, 0.1 for narrow correlator)); and $S/N_o$ represents the signal-to-noise density ratio in Hz.

The measurement noise is not necessarily statistically time-independent, depending upon what the value of $B_L$ is. The time correlation is based upon the time constant of the code tracking loop, and is given as $$\rho_k = e^{-4B_L \Delta t_k} \quad (16)$$

A multi-path variance model is also used to account for variance to multi-path effects. This model preferably has the form (as adapted from Murphy, T., "Proposed Allocation of Accuracy Between Ground and Airborne Subsystems for GBAS," Paper GNSS-WGD-WP/D 22, presented May, 1997, to the ICAO GNSSP WGD Meeting and to the RTCA SC-159 WG 4 in July, 1997):

$$\sigma^2_{i,k,model} = \left(a + be^{\left(\frac{-\theta}{c}\right)}\right)^2 \quad (17)$$

where a, b, c are derived constants based on receiver performance as a function of satellite elevation angle, i.e., the elevation angle between the GPS receivers and the satellite as measured by the reference stations. This model can also be used to define the a priori statistics of Equations 9 and 10 based upon measured data during installation and on a periodic basis.

As those skilled in the art will appreciate, methods of determining the prior variance and mean can also be utilized such as taking the mean and variance for a longer time period (for example, n>6) of the UDRE data residual.

Thus, the preferred method for developing the error bound on the broadcast differential corrections includes developing prior differential correction error statistics (which represent the characterization of the receiver's performance) over a long period of time (such as, for example, developing the statistics over the last one or two minutes) or based upon the known equipment characterization or performance models, and developing current differential correction error statistics over a short period of time (for example, over the last few seconds), and then using a Bayesian interval estimation bounding process incorporating the current and the prior differential correction statistics.

Although the present invention has been described in considerable detail with reference to certain presently preferred versions thereof, other versions are possible without departing from the spirit and scope of the present invention. Therefore the appended claims should not be limited to the description of the preferred versions contained herein.

We claim:

1. A differential GPS landing system for broadcasting a set of differential corrections relating to a plurality of GPS satellites, wherein each GPS satellite broadcasts GPS signals comprising information sufficient to calculate a pseudorange to the satellite, the system comprising:
   (i) at least three GPS receivers at known locations in spatial proximity to each other, each of the GPS receivers comprising means for independently receiving the GPS signals from the plurality of GPS satellites and producing a receiver output signal comprising a set of pseudoranges for the GPS satellites to the particular receiver;
   (ii) at least three reference stations, each reference station comprising:
      means for receiving the receiver output signal from a different two of the at least three GPS receivers;
      means for calculating two separate differential corrections for each satellite, each of the differential corrections being independently calculated using the output signals received from a different one of the two GPS receivers; and
      means for averaging the two calculated differential corrections for each satellite to produce an averaged differential correction for each satellite; and
   (iii) means for validating the averaged differential correction for each satellite calculated by each reference station and for broadcasting the averaged differential correction for each satellite calculated by one of the three reference stations.

2. The differential GPS landing system of claim 1 wherein the means for validating the averaged differential correction comprises two integrity monitors, each integrity monitor comprising means for receiving the averaged differential corrections from a different two of the at least three reference stations, and means for comparing, with respect to each GPS satellite, the averaged differential corrections from the two of the at least three reference stations to produce a validated set of differential corrections comprising a validated differential correction for each satellite, and wherein the means for broadcasting comprises means for broadcasting the validated differential correction for each satellite produced by one of the integrity monitors.

3. The differential GPS landing system of claim 2 wherein the means for comparing comprises means for comparing the averaged differential corrections from the two of the at least three reference stations and for removing a differential correction for a particular satellite from the validated set of differential corrections if the comparison exceeds a predetermined correction value.

4. The differential GPS landing system of claim 2 further comprising means for comparing the validated differential corrections from each of the two integrity monitors to produce a broadcast set of differential corrections comprising one differential correction value for each GPS satellite.

5. The differential GPS landing system of claim 4 wherein the means for broadcasting comprises means for broadcasting the broadcast set of differential corrections for reception and processing by one or more aircraft flying in spatial proximity to the differential GPS landing system.

6. The differential GPS landing system of claim 5 further comprising means for receiving the broadcast set of differential corrections and means for comparing the received broadcast set of differential corrections to the broadcast set of differential corrections to validate the broadcast set of differential corrections.

7. The differential GPS landing system of claim 6 further comprising means responsive to the signals broadcast by the GPS satellites and the received broadcast set of differential corrections for computing the position of the means for receiving the broadcast set of differential corrections and for comparing the computed position with the known location of the means for receiving to a predetermined position threshold and for halting the broadcast of differential corrections if the comparison exceeds the predetermined position threshold.

8. The differential GPS landing system of claim 2 wherein the reference stations further comprise means for computing a user differential range error value for each satellite, the error value representing an estimate of the error of the averaged differential correction for that particular satellite, the means for computing the user differential range error value comprising:
   means for developing prior differential correction error statistics over a first period of time representing the behavior of the error of the averaged differential correction over the first period of time;
   means for computing current differential correction error statistics representing the behavior of the error of the averaged differential correction over a second period of time; and
   Bayesian statistical means for calculating the user differential range error value using a Bayesian interval estimation bounding process incorporating the current and the prior differential correction error statistics.

9. The differential GPS landing system of claim 8 further comprising:
   means for forming a differential correction residual from the averaged differential correction computed by one of the at least three reference stations and the averaged differential correction computed by a different one of the at least three reference stations;

means for calculating a long-term mean and a long-term variance of the differential correction residual;

means for calculating a short-term mean and a short-term variance of the differential correction residual;

wherein the means for developing the prior differential correction error statistics comprises means for developing the prior differential correction error statistics as a function of prior parameters including the long-term mean and the long-term variance of the differential correction residual; and wherein the means for computing the current differential correction error statistics comprises means for computing the current differential correction error statistics as a function of current parameters including the short-term mean and the short-term variance of the differential correction residual.

10. The differential GPS landing system of claim 9 wherein the references stations further comprises means for measuring the elevation angle between the GPS receivers and the particular satellite and the GPS receivers have a known receiver signal-to-noise ratio; and wherein the prior parameters further include the elevation angle and the receiver signal-to-noise ratio.

11. The differential GPS landing system of claim 8 wherein the integrity monitors further comprise means for comparing, for each satellite, the user differential range error value computed by each reference station with a predetermined tolerance.

12. A method for broadcasting a set of differential corrections relating to a plurality of GPS satellites, wherein each GPS satellite broadcasts GPS signals comprising information sufficient to calculate a pseudorange to the satellite, the method comprising the steps of:

(i) providing at least three GPS receivers at known locations in spatial proximity to each other;

(ii) independently receiving, by each of the GPS receivers, the GPS signals from the plurality of GPS satellites;

(iii) producing a receiver output signal comprising a set of pseudoranges for the GPS satellites to the particular receiver;

(iv) providing at least three reference stations to receive the receiver output signal from a different two of the at least three GPS receivers;

(v) calculating two separate differential corrections for each satellite, each of the differential corrections being independently calculated by each reference station using the output signals received from a different one of the two GPS receivers;

(vi) averaging the two calculated differential corrections for each satellite to produce an averaged differential correction for each satellite;

(vii) validating the averaged differential correction for each satellite calculated by each reference station; and (viii) broadcasting the averaged differential correction for each satellite calculated by one of the three reference stations.

13. The method of claim 12 further comprising the step of computing a user differential range error value for each satellite, the error value representing an estimate of the error of the averaged differential correction for that particular satellite, the step of computing the user differential range error value comprising the steps of:

developing prior differential correction error statistics over a first period of time representing the behavior of the error of the averaged differential correction over the first period of time;

computing current differential correction error statistics representing the behavior of the error of the averaged differential correction over a second period of time; and calculating the user differential range error value using a Bayesian interval estimation bounding process incorporating the computed current differential correction error statistics and the developed prior differential correction error statistics.

14. The method of claim 13 further comprising the steps of:

forming a differential correction residual from the averaged differential correction computed by one of the at least three reference stations and the averaged differential correction computed by a different one of the at least three reference stations;

calculating a long-term mean and a long-term variance of the differential correction residual;

calculating a-short-term mean and a short-term variance of the differential correction residual;

wherein the step of developing the prior differential correction error statistics comprises the step of developing the prior differential correction error statistics as a function of prior parameters including the long-term mean and the long-term variance of the differential correction residual; and wherein the step of computing the current differential correction error statistics comprises the step of computing the current differential correction error statistics as a function of current parameters including the short-term mean and the short-term variance of the differential correction residual.

15. The method of claim 14 wherein the GPS receivers have a known receiver signal-to-noise ratio and further comprising the step of measuring the elevation angle between the GPS receivers and the particular satellite and wherein the prior parameters further include the elevation angle and the receiver signal-to-noise ratio.

* * * * *